(12) United States Patent
Knöpfle

(10) Patent No.: US 12,162,336 B2
(45) Date of Patent: Dec. 10, 2024

(54) VEHICLE ROOF COMPRISING A ROOF OPENING SYSTEM HAVING TWO KINEMATICS UNITS

(71) Applicant: Webasto SE, Stockdorf (DE)

(72) Inventor: Julian Knöpfle, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 274 days.

(21) Appl. No.: 17/786,850

(22) PCT Filed: Dec. 2, 2020

(86) PCT No.: PCT/EP2020/084327
§ 371 (c)(1),
(2) Date: Jun. 17, 2022

(87) PCT Pub. No.: WO2021/130001
PCT Pub. Date: Jul. 1, 2021

(65) Prior Publication Data
US 2023/0030114 A1 Feb. 2, 2023

(30) Foreign Application Priority Data

Dec. 23, 2019 (DE) ..................... 10 2019 135 699.7

(51) Int. Cl.
*B60J 7/02* (2006.01)
*B60J 7/043* (2006.01)
(Continued)

(52) U.S. Cl.
CPC ............. *B60J 7/024* (2013.01); *B60J 7/0435* (2013.01); *B60J 7/0573* (2013.01);
(Continued)

(58) Field of Classification Search
CPC ......... B60J 7/024; B60J 7/0435; B60J 7/0573
See application file for complete search history.

(56) References Cited

U.S. PATENT DOCUMENTS

| 4,741,573 A | 5/1988 | Yokota | |
|---|---|---|---|
| 4,893,869 A * | 1/1990 | Fuerst | B60J 7/0435 296/216.03 |
| 6,224,146 B1 * | 5/2001 | Willard | B60J 7/0435 296/216.03 |

FOREIGN PATENT DOCUMENTS

| DE | 3523882 A1 | 1/1987 |
|---|---|---|
| DE | 3532111 A1 | 3/1987 |

(Continued)

OTHER PUBLICATIONS

Machine translation of Langguth et al. (DE 102005059285 A1), published Jun. 28, 2007. (Year: 2007).*
PCT International Search Report and Written Opinion, PCT/EP2020/084327, Mar. 4, 2021, 16 pages.
German Office Action, corresponding to 10 2019 135 699.7, dated Oct. 24, 2023.

*Primary Examiner* — Daniel J Colilla
(74) *Attorney, Agent, or Firm* — Quarles & Brady LLP

(57) ABSTRACT

A vehicle roof has a roof opening system comprising a lid element displaceable between a closed and open position displacement kinematics for displacing the lid, each of the displacement kinematics comprising a guide rail, a first and second kinematic unit guided in a guide rail, and a set of drive cables for the kinematic units, the second kinematic unit comprising a tilting lever, to which a gliding element is pivotably connected on which a guide track of a lid carrier of the lid element is guided when the lid element is displaced. The first kinematic unit is driven via a first drive cable by a first drive motor and the second kinematic unit has a control rod which is hinged to the tilting lever and to a drive slide which is driven via a second drive cable by a second drive motor.

5 Claims, 10 Drawing Sheets

(51) Int. Cl.
*B60J 7/057* (2006.01)
*E05D 15/10* (2006.01)
*E05D 15/32* (2006.01)
*E05D 15/56* (2006.01)
*E05F 15/00* (2015.01)

(52) U.S. Cl.
CPC ....... *E05D 15/101* (2013.01); *E05D 15/1047* (2013.01); *E05D 15/32* (2013.01); *E05D 15/565* (2013.01); *E05F 15/00* (2013.01); *E05Y 2201/43* (2013.01); *E05Y 2201/626* (2013.01); *E05Y 2201/64* (2013.01); *E05Y 2201/654* (2013.01); *E05Y 2201/684* (2013.01); *E05Y 2900/542* (2013.01)

(56) References Cited

FOREIGN PATENT DOCUMENTS

| | | |
|---|---|---|
| DE | 3735686 C1 | 12/1988 |
| DE | 102005059285 A1 | 6/2007 |
| DE | 202010012974 U1 | 2/2012 |
| DE | 102017106510 A1 | 9/2018 |
| DE | 102017207892 A1 | 11/2018 |
| DE | 102018124382 A1 | 4/2020 |
| EP | 2263897 B1 | 12/2010 |
| EP | 3124300 A1 | 2/2017 |
| EP | 3405359 A1 | 11/2018 |

\* cited by examiner

VEHICLE ROOF COMPRISING A ROOF OPENING SYSTEM HAVING TWO KINEMATICS UNITS

This application represents the national stage entry of PCT International Patent Application No. PCT/EP2020/084327 filed on Dec. 2, 2020, which claims priority of German Application 10 2019 135 699.7 filed Dec. 23, 2019, the contents of which are incorporated by reference as if set forth in their entirety herein.

The disclosure relates to a vehicle roof.

A vehicle roof of this kind is known from practice and can be formed in particular as a so-called spoiler roof, which comprises a roof opening system in which a lid element can be lifted upward at its rear edge relative to a solid roof portion starting from a closed position, in which a roof opening is closed, and be moved across the solid roof portion in the direction of the rear or the longitudinal roof direction so as to open the roof opening. The lid element is coupled to displacement kinematics on either side of a vertical longitudinal center roof plane, whereby it is displaceable between the closed position and the open position. The displacement kinematics each comprise a front kinematic unit moveable in a guide rail and a rear kinematic unit also disposed in the guide rail. When the lid element is being displaced into the open position, a tilting lever of the rear kinematic unit is pivoted, causing the rear edge of the lid element to be lifted. Then the front kinematic unit is decoupled from the rear kinematic unit and moved rearward in the guide rail, a slotted track or control track formed on the lid element being moved to the tilting lever of the now stationary rear kinematic unit, the tilting lever being provided with a gliding element. When the tilting lever is being tilted, the front kinematic unit and the rear kinematic unit are connected via a coupling rod. Once the tilting lever has been tilted, the coupling rod is detached from the front kinematic unit, causing the rear kinematic unit to stay in place and allowing the front kinematic unit to be moved in the direction of the stationary rear kinematic unit. Thus, the two kinematic units are driven via a shared drive or a shared drive cable driven by a drive motor. The coupling rod for operating the rear kinematic unit requires structural space within the respective guide rail, which, in turn, requires a certain minimum height of the respective guide rail. In particular structural space in the vertical direction of the vehicle may be at the expense of vehicle passengers' headroom. Moreover, malfunctions and disruptive noises may occur when the coupling rod is being decoupled from the front kinematic unit and when the coupling rod is being coupled to the front kinematic unit.

The object of the-disclosure is to provide a vehicle roof of the kind described above which allows a small structural height of the guide rails and ensures high operational reliability.

So the vehicle roof according to the disclosure comprises displacement kinematics having two kinematic units which are disposed on either side of a vertical longitudinal roof plane, which are each driven by means of a separate drive member comprised of a drive motor and a drive cable. The second kinematic unit is driven via a control rod which is provided with a drive slide which is connected to the drive cable of the second kinematic unit. Lever ratios which allow a pivoting of the tilting lever using small driving forces can be achieved by means of the control rod which is hinged to the tilting lever, both when the tilting lever is being tilted for lifting the lid element and when the tilting lever is being put down for displacing the lid element into its closed position.

In addition, with the vehicle roof according to the disclosure, each of the two drive cables, which are assigned to the two kinematic units, is driven separately. Thus, coupling the two kinematic units via a coupling rod or the like is not required. Instead, it is merely necessary to operate the two drive motors for the two kinematic units in coordination with each other, which is carried out by means of a suitable control unit which is connected to the two drive motors. This ensures high operational reliability. Furthermore, because no coupling rod to be coupled and decoupled is provided, noises which may be disruptive do not occur. The bilaterally disposed guide rails, which are each assigned two kinematic units, each have two cable duct sections in which one drive cable each is guided, one of which serves to drive the first kinematic unit and the other serving to drive the second kinematic unit. The cable duct sections can be formed in the guide rail without much structural space being required, which constitutes a great advantage in terms of structural space in the vertical roof direction and/or in the transverse roof direction compared to a vehicle roof having a coupling rod for the two kinematic units. The headroom for the vehicle passengers can thus be increased compared to the state of the art.

In the absence of the coupling rod between the two kinematic units, the displacement kinematics can be designed with less complexity. Additionally, the guide rails, in which the kinematic units are disposed, can be narrower compared to displacement kinematics having a coupling rod, which, in turn, benefits the see-through roof portion provided by the vehicle roof.

The cable duct sections for the two drive cables of the kinematic units which are assigned to a guide rail are in particular disposed on top of each other on one side of the guide track. Alternatively, the cable duct sections for the two drive cables can be disposed side by side. It is also conceivable that one of the two cable duct sections is disposed on one side of a guide track for the kinematic units and the other cable duct section of the two cable duct sections is disposed on the other side of said guide track. The cable duct sections can extend over the entire length of the guide rail such that the guide rail can be manufactured in particular as an extruded profile.

In a specific embodiment of the vehicle roof according to the disclosure, in which one of the drive motors for the drive cables is disposed at the front or to the front of the roof opening relative to the orientation of the roof and the other drive motor is disposed at the rear or to the rear of the roof opening relative to the orientation of the roof, the two cable duct sections are disposed one behind the other in the longitudinal direction of the guide rail. In this case, the two cable duct sections can also be flush which each other or transition into each other and have the same cross section such that the two cable duct sections can be formed by the same profile duct.

The roof opening system of the vehicle roof according to the disclosure is in particular the roof opening system of a spoiler roof, in which the bilaterally disposed rear kinematic units advantageously each have a tilting lever interacting with a guide track or a slotted track formed on a lid carrier of the lid element via the assigned gliding element.

In a specific embodiment of the vehicle roof according to the disclosure, the gliding element and the control rod have a shared pivot axis on the tilting lever. Thus, only a bearing pin which defines the shared pivot axis must be formed on the tilting lever for the gliding element and for the control rod. Additionally, the adjustment force, which is transferred to the tilting lever from the control rod, can be low because of the resulting lever ratios. Thus, the second kinematic units only require a small and thus cost-effective drive motor for the second kinematic units. In the closed position, the tilting lever and the control rod can be in a stretched position relative to each other.

In another specific embodiment of the vehicle roof according to the disclosure, the tilting lever has a bearing pin which defines a pivot axis of the tilting lever on the guide rail and which is guided in a guide track of the assigned guide rail. When the tilting lever is being pivoted by means of the control rod, the bearing pin in the guide track is being displaced. Thus, the position of the pivot axis of the tilting lever changes when the tilting lever is being displaced.

To keep the adjustment forces in an extended position between the control rod and the tilting lever low, the tilting lever has a control pin which is disposed in a slotted track or control track of the guide rail in the closed position of the lid element in an advantageous embodiment of the vehicle roof according to the disclosure, the slotted track or control track initiating a tilting movement of the tilting lever when the lid element is being displaced from the closed position to the open position. Thus, the control track runs in particular at an angle relative to the extension of the guide rail and thus relative to the shifting direction of the drive slide of the control rod.

To retain the tilting lever in a defined position in the tilted state, the tilting lever preferably has a retaining pin which engages in a retaining track or abuts on a retaining surface formed on the guide rail when the tilting lever is tilted. Thus, the retaining pin serves to secure the tilting lever in its tilted state in the longitudinal direction of the guide rail.

Other advantages and advantageous configurations of the subject matter of the disclosure are apparent from the description, the drawing and the claims.

One exemplary configuration of a vehicle roof according to the disclosure is illustrated in a schematically simplified manner in the drawing and will be explained in more detail in the following description.

Figure 1:
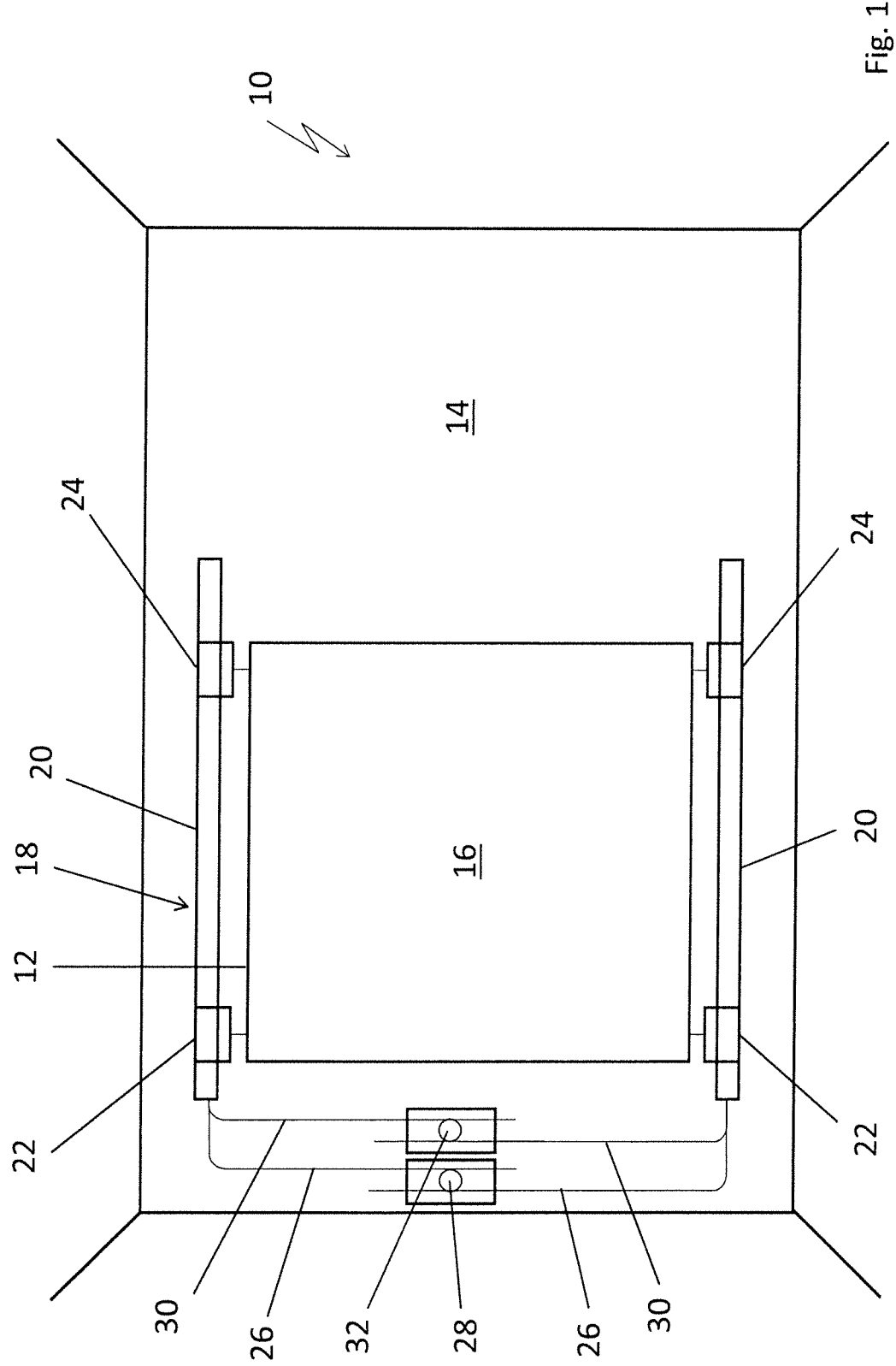
FIG. 1 is a schematic top view of a vehicle roof according to the disclosure.

In a highly schematic fashion, FIG. 1 shows a vehicle roof 10 which is an openable vehicle roof of a passenger car and which has a roof opening 12 limited by a solid roof portion 14 and capable of being selectively closed or at least partially opened by means of a lid element 16. Lid element 16 is part of a roof opening system 18 forming a spoiler roof.

Roof opening system 18 of vehicle roof 10 comprises a guide rail 20 on either side of a vertical longitudinal roof plane. In each guide rail 20, a front first kinematic unit 22 and a rear second kinematic unit 24 is disposed. Front kinematic units 22 are driven by means of a first drive motor 28 via first drive cables 26. Rear kinematic units 24 are driven by means of a second drive motor 30 via second drive cables 30. In the embodiment at hand, drive motors 28 and 32 are each disposed centrally on a front frame part of a roof frame (not illustrated) forward of roof opening 12.

Roof opening system 18, which is illustrated in detail in FIGS. 2 to 9, is essentially symmetrical relative to a vertical longitudinal roof plane. Thus, the following description is mostly aimed at the displacement kinematics disposed on the left relative to the forward direction of travel of the vehicle in question. The displacement kinematics disposed on the right relative to the forward direction of travel are essentially symmetrical and is therefore apparent by analogy. Additionally, components of the roof opening system which are disposed in different planes in the transverse roof direction are projected into the drawing plane in FIGS. 2 to 8.

As described above, the displacement kinematics each comprise a front kinematic unit 22 and a rear kinematic unit 24 which are disposed in a shared guide rail 20 and which are connected to separate drive cables 26 and 30, respectively. Drive cables 26 and 30 are guided in respective guide rail 20 on top of each other in guide channels 34 and 36 formed in guide rail 20 on a side of a guide track 38. The cable duct sections for the two drive cables of the kinematic units which are assigned to a guide rail are in particular disposed on top of each other on one side of the guide track. Kinematic units 22 and 24 are guided or disposed in guide track 38.

Figure 6:
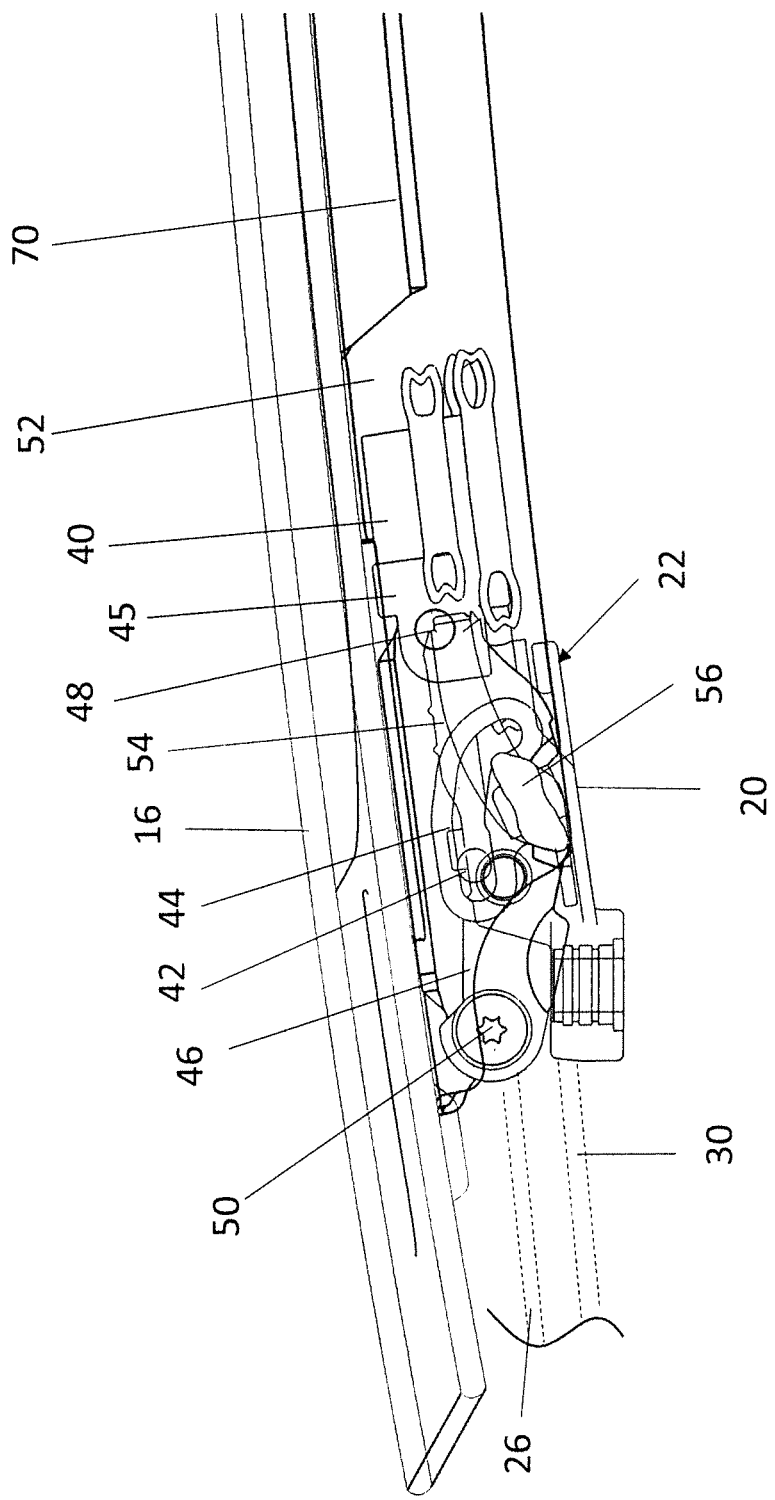
FIG. 6 is an enlarged view of a front kinematic unit of the roof opening system for the closed position of the lid element.
Figure 7:
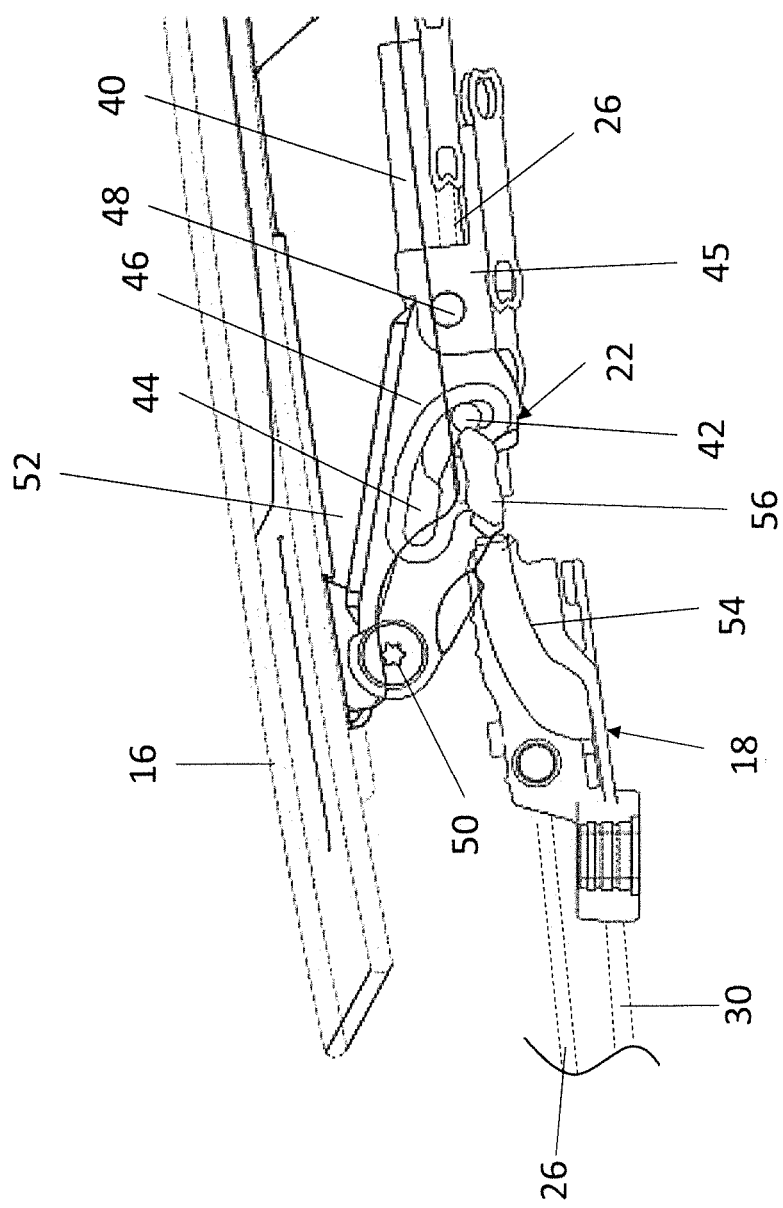
FIG. 7 is a view of the front kinematic unit corresponding to FIG. 6, but for the lifted state of the lid element.

As shown in FIGS. 6 and 7 in particular, front kinematic unit 22 comprises a drive slide 40, which is connected to drive cable 26 guided in guide channel 34, and on which a pin 42 guided in a tilting 44 is formed. Tilting 44 is formed on a tilting lever 46 which is hinged to a slide 45 via a hinge point 48 at one end and to a lid carrier 52 via a hinge point 50 at the other end, lid carrier 52 being fastened to the underside of lid element 16. Furthermore, front kinematic unit 22 comprises a slotted track 54 which is formed on the front end of guide rail 20 and interacts with a guide pin 56 which is disposed on tilting lever 46.

Figure 8:
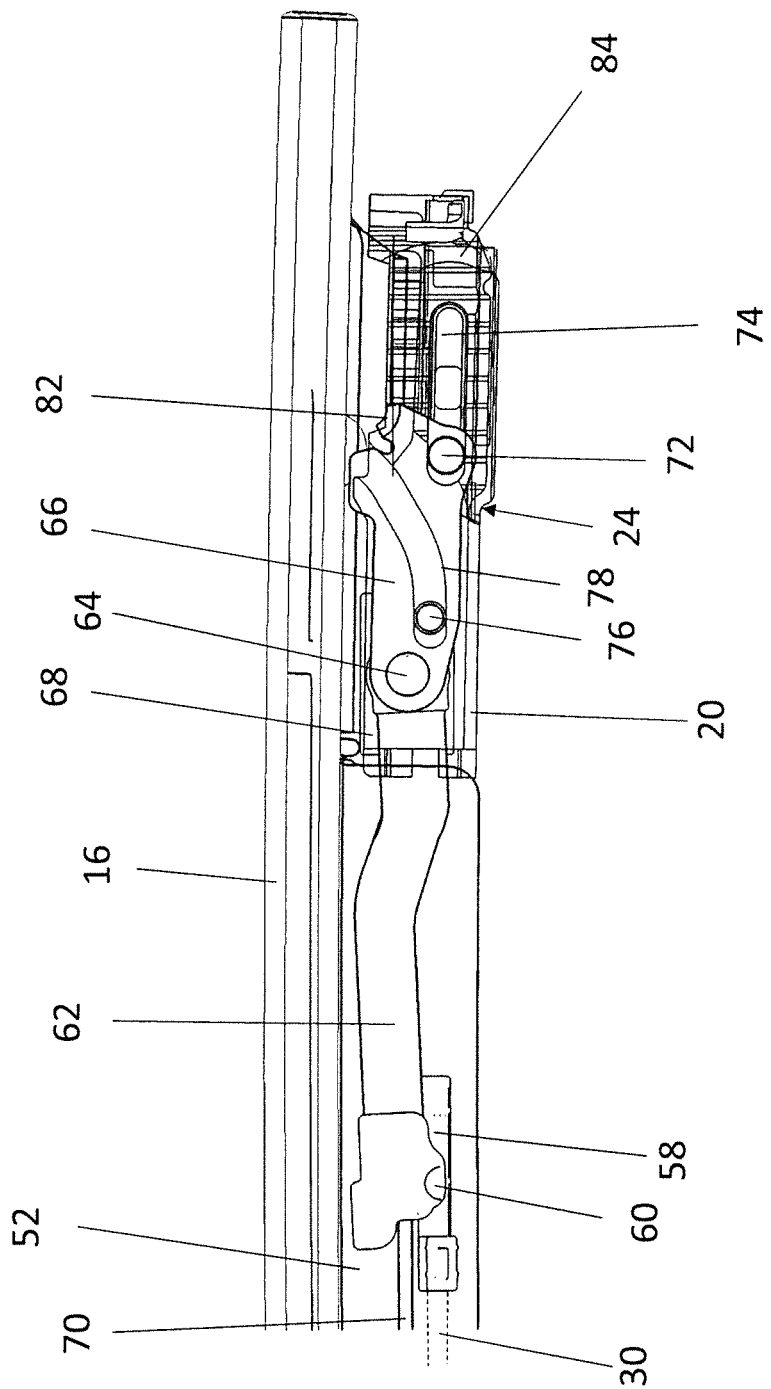
FIG. 8 shows a rear kinematic unit of the roof opening system for the closed position of the lid element.
Figure 9:
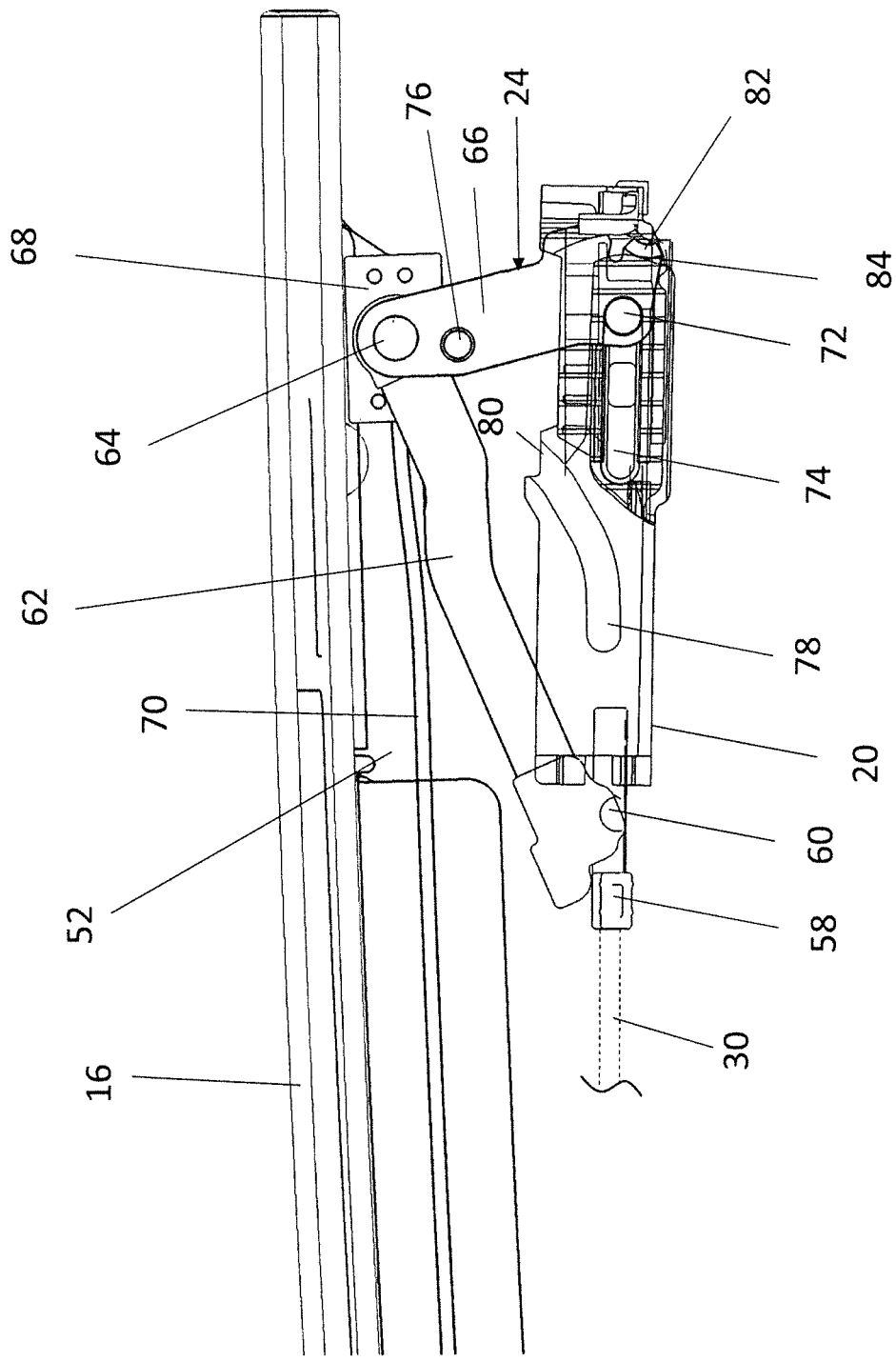
FIG. 9 is a view of the rear kinematic unit of the roof opening system corresponding to FIG. 8, but for the lifted state of the lid element.
Figure 10:
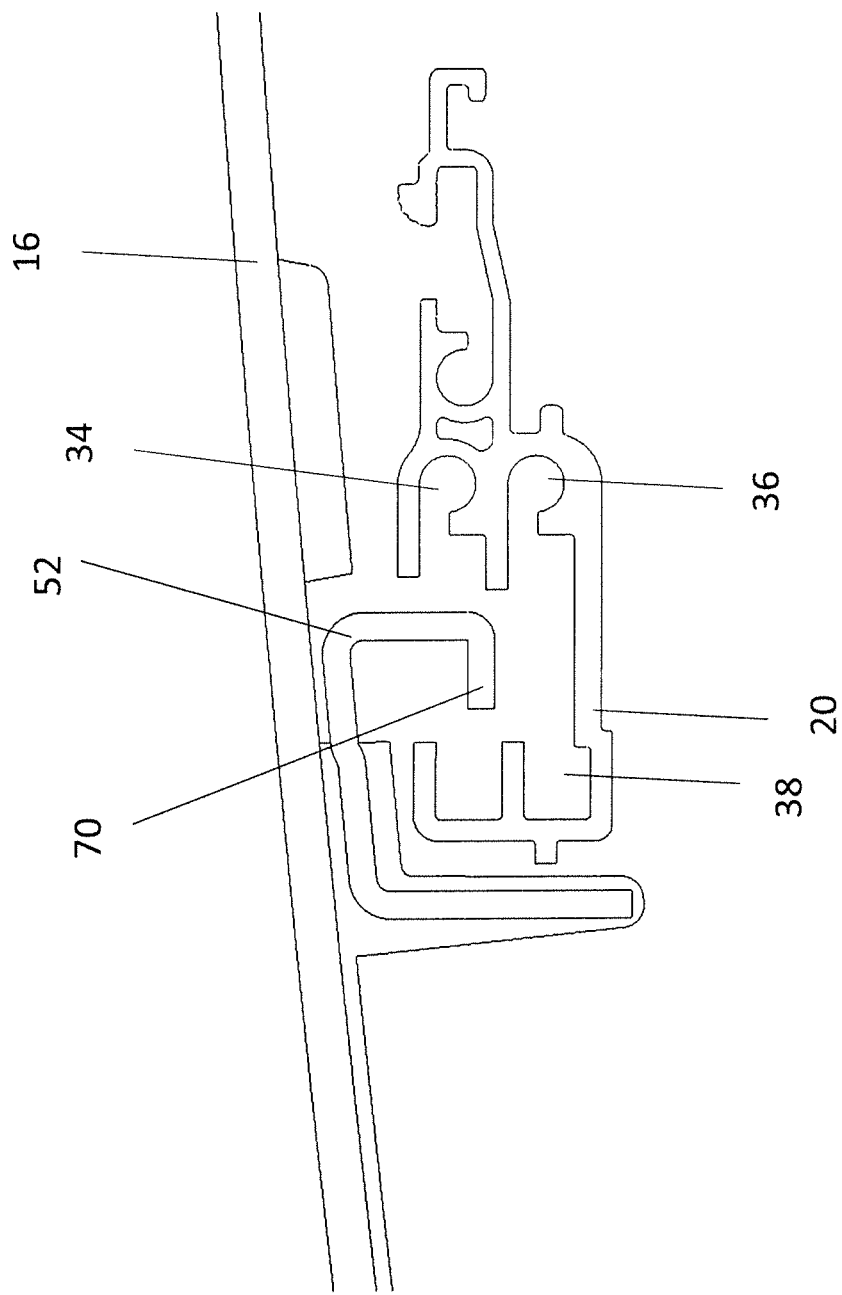
FIG. 10 is a section through a guide rail of the roof opening system.

Rear kinematic unit 24, which is illustrated in detail in FIGS. 8 and 9, comprises a drive slide 58 which is connected to second drive cable 30 and which is guided in guide channel 36 of guide rail 20. A control rod 62 is hinged to second drive slide 58 via a hinge point 60, control rod 62 being hinged to a tilting lever 66 in a hinge point 64 by means of its end facing away from drive slide 58. A gliding element 68 is mounted so as to be pivotable on tilting lever 66, the pivot axis of gliding element 68 coinciding with the pivot axis of hinge point 64. Gliding element 68 is guided so as to be displaceable on a guide track 70 formed on lid carrier 52, which is disposed on the underside of lid element 16.

In its end portion facing away from hinge point 64, tiling lever 66 has a bearing pin 72 which is guided so as to be displaceable in a guide track 74 formed on guide rail 20. Additionally, a control pin 76 is disposed on tilting lever 66 in an area distanced from bearing pin 72, control pin 76 interacting with a slot 78, which is also formed on guide rail 20 and has a curved shape with an outlet opening 80 on the upper side. In its end portion facing away from hinge point 64, tilting lever 66 has a retaining pin 82 which interacts with a retaining track 84 in the tilted state of tilting lever 66, retaining track 84 being formed on guide rail 20 and being essentially perpendicular.

Roof opening system 18 which is described above operates in the manner described in the following.

Figure 2:
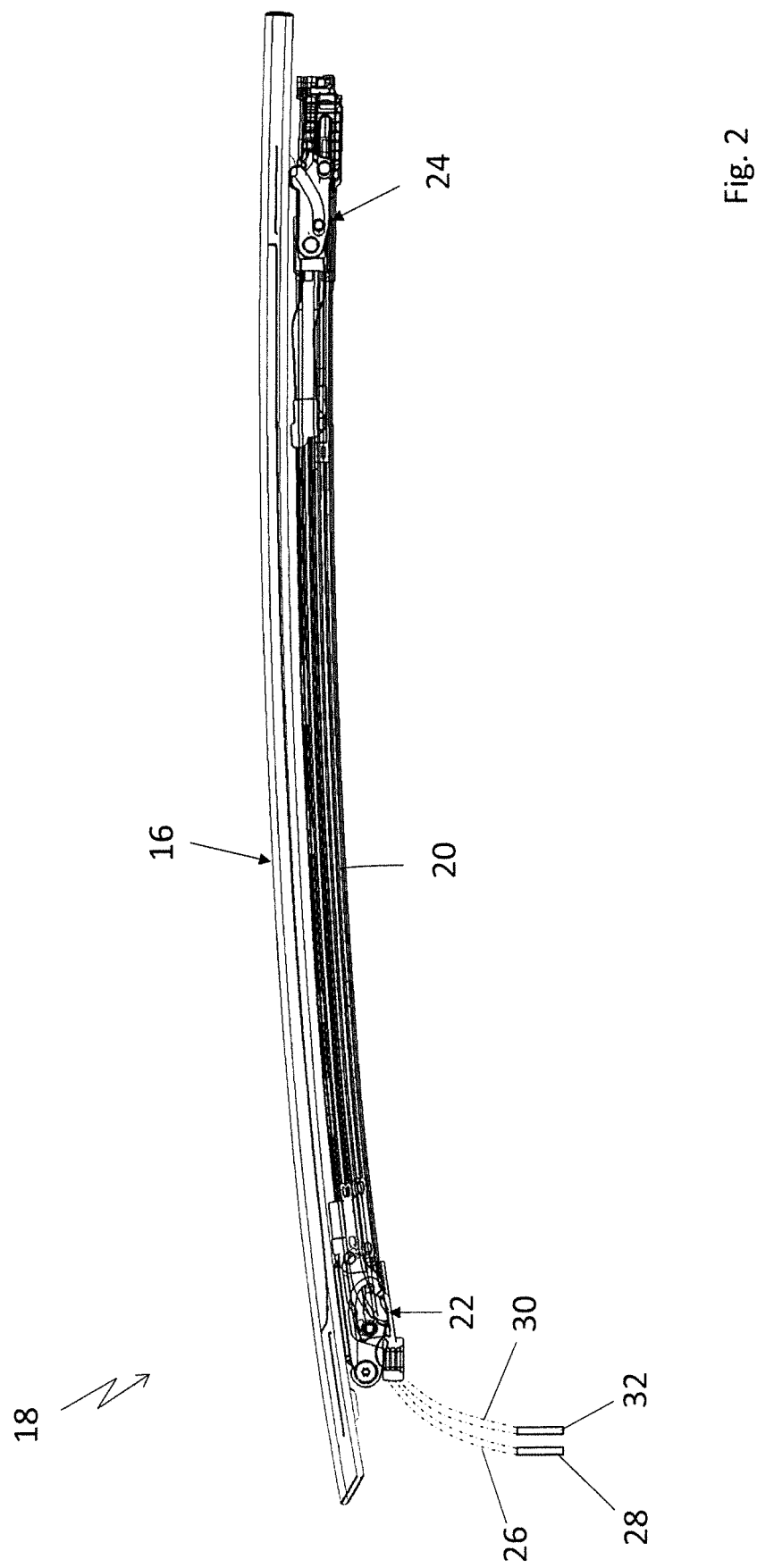
FIG. 2 is a schematic side view of a roof opening system of the vehicle roof of FIG. 1 with a lid element in a closed position.
Figure 3:
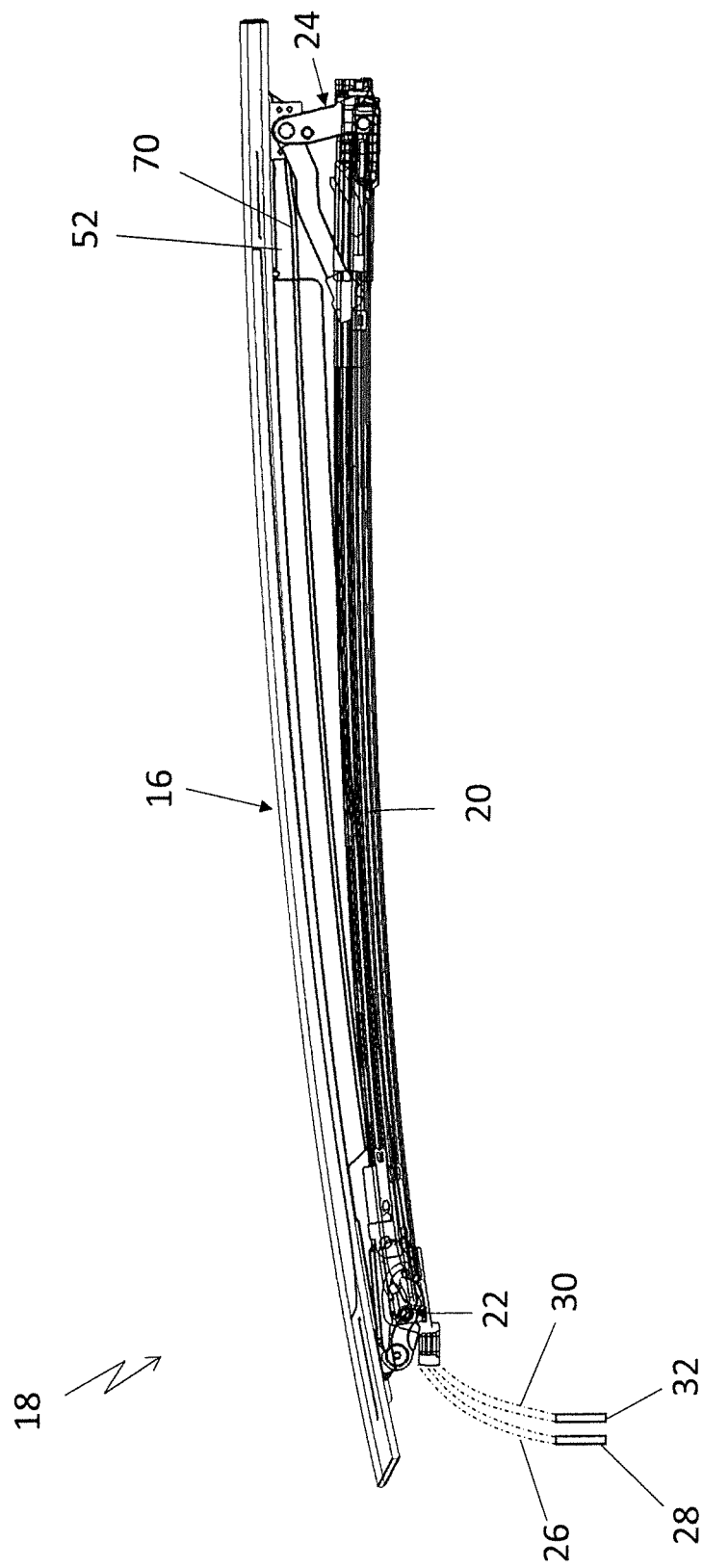
FIG. 3 is a view of the roof opening system corresponding to FIG. 2, but with the lid element in a ventilation position.
Figure 4:
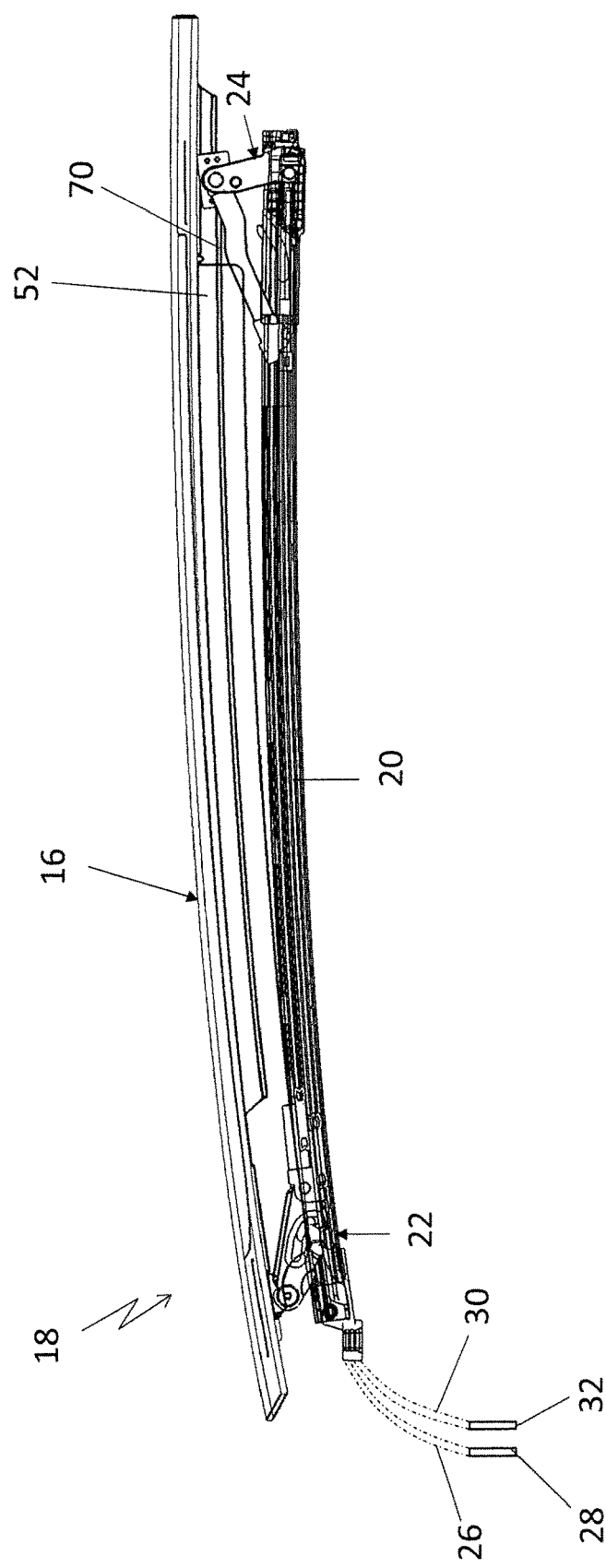
FIG. 4 is also a view of the roof opening system corresponding to FIG. 2, but with the lid element moved slightly rearward.
Figure 5:
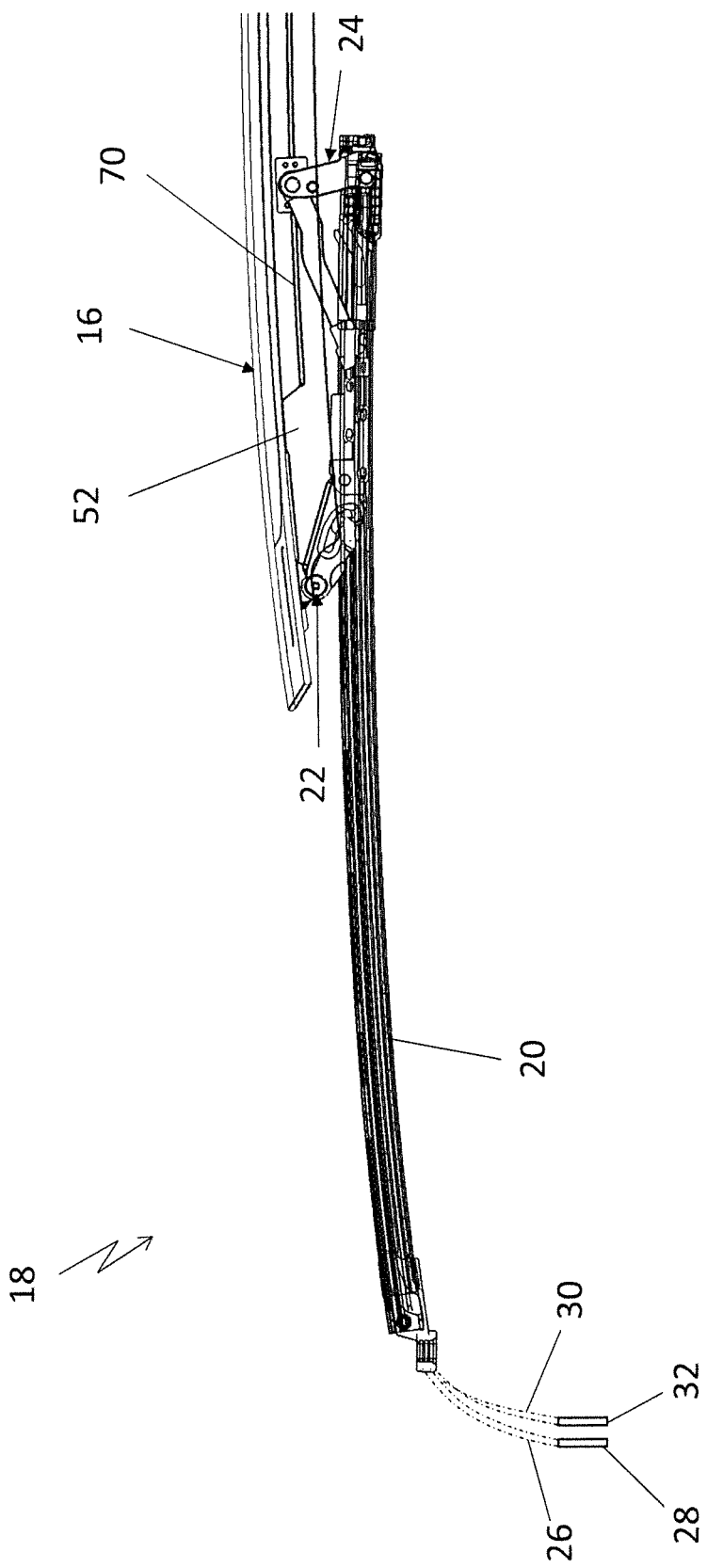
FIG. 5 is also a view of the roof opening system corresponding to FIG. 2, but with the lid element in an open position.

In order to shift lid element 16 from the closed position illustrated in FIG. 2 into the open position illustrated in FIG. 5, both drive motors 28 and 32 are operated first, whereby drive slide 40 is moved relative to slide 45 by means of the first drive cable, as illustrated in FIGS. 6 to 9, causing the front edge of lid element 16 to be slightly lifted by the interaction of pin 42 formed on drive slide 40 with tilting 44 of tilting lever 46 and by the interaction of guide pin 56 with slotted track 54. At the same time, tilting lever 66 is moved rearward via control rod 62 by means of second drive cable 30, whereby control pin 76 guided in slot 78 causes a tilting of tilting lever 66. Additionally, a torque acting in the tilting direction is introduced into tilting lever 66 via control rod 62. When bearing pin 72 comes into contact with the rear front face of guide track 74, retaining pin 82 of tilting lever 66 engages in retaining track 84 of guide rail 20. Thus, tilting lever 66 is secured in the longitudinal direction of guide rail 20. Drive slide 58 is being displaced until tilting lever 66 has reached its tilting position illustrated in FIG. 9. Control pin 76 has then left slot 78. Second drive motor 32 can then be stopped. A further actuation of first drive motor 28 drives drive slide 40 further in the direction of the rear via first drive cable 26. Pin 42 which is formed on drive slide 50 and disposed in tilting 44 thus pulls lid element 16 further in the direction of the rear, the tilting position of tilting lever 46 being secured by guide pin 56 disposed in a guide channel of guide rail 20. When lid element 16 is driven back, guide track 70 of lid carrier 52 is guided on gliding element 68 of rear second kinematic unit 24, such that lid element 16 is moved over solid roof portion 14.

Lid element 16 is moved from its open position into its position in the analog opposite manner, such that a detailed description relating thereto is not required.

Various other modifications and variations to the preferred embodiments can be made within the spirit and scope of the invention. Therefore, the invention should not be limited to the described embodiments. To ascertain the full scope of the invention, the following claims should be referenced.

REFERENCE SIGNS 10 vehicle roof
12 roof opening
14 solid roof portion
16 lid element
18 roof opening system
20 guide rail
22 first kinematic unit
24 second kinematic unit
26 first drive cable
28 first drive motor
30 second drive cable
32 second drive motor
34 first guide channel
36 second guide channel
38 guide track
40 drive slide
42 pin
44 tilting
45 slide
46 tilting lever
48 hinge point
50 hinge point
52 lid carrier
54 slotted track
56 guide pin
58 drive slide
60 hinge point
62 control rod
64 hinge point
66 tilting lever
68 sliding element
70 guide track
72 bearing pin
74 guide track
76 control pin
78 slot
80 outlet opening
82 retaining pin
84 retaining track

The invention claimed is:

1. A vehicle roof having a roof opening system, the vehicle roof comprising:
   a lid element displaceable between a closed position, in which a roof opening is closed, and an open position, in which the roof opening is open,
   displacement kinematics for displacing the lid element which are disposed on either side of a vertical longitudinal roof plane, each of the displacement kinematics comprising:
      a guide rail,
      a first kinematic unit guided in the guide rail and a second kinematic unit guided in the guide rail, and
      a set of drive cables for the two kinematic units,
      each second kinematic unit comprising a respective second tilting lever, to which a respective second gliding element is connected so as to be pivotable, on which a guide track of a lid carrier of the lid element is guided when the lid element is being displaced,
   wherein each first kinematic unit is driven via a respective first drive cable of the set of drive cables by a respective first drive motor and each second kinematic unit has a respective second control rod which is hinged to the respective second tilting lever and which is hinged to a respective second drive slide which is driven via a respective second drive cable of the set of drive cables by a second drive motor, and
   wherein each first kinematic unit is a front kinematic unit and comprises a respective first drive slide and a respective first tilting lever hinged to the lid carrier and comprising a respective first tilting slot in which a respective first pin is guided which is formed on the respective first drive slide of each first kinematic unit.

2. The vehicle roof according to claim 1, wherein the respective second gliding element and the respective second control rod have a shared pivot axis on the respective second tilting lever.

3. The vehicle roof according to claim 1, wherein the respective second tilting lever has a respective second bearing pin which defines a pivot axis of the respective second tilting lever on the guide rail and which is guided in a guide track of an assigned guide rail.

4. The vehicle roof according to claim 1, wherein the respective second tilting lever has a respective second control pin which is disposed in a slot of the guide rail in the closed position of the lid element, the slot initiating a tilting movement of the respective second tilting lever when the lid element is being displaced from the closed position to the open position.

5. The vehicle roof according to claim 1, wherein the respective second tilting lever has a respective second retaining pin which engages in a retaining track formed on the guide rail when the respective second tilting lever is being tilted.

* * * * *